US008972747B2

(12) United States Patent
Simske et al.

(10) Patent No.: US 8,972,747 B2
(45) Date of Patent: Mar. 3, 2015

(54) MANAGING INFORMATION IN A DOCUMENT SERIALIZATION

(75) Inventors: Steven J. Simske, Fort Collins, CO (US); Helen Balinsky, Cardiff (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 13/014,062

(22) Filed: Jan. 26, 2011

(65) Prior Publication Data

US 2012/0191983 A1   Jul. 26, 2012

(51) Int. Cl.
| | |
|---|---|
| G06F 11/30 | (2006.01) |
| G06F 12/14 | (2006.01) |
| G06F 7/04 | (2006.01) |
| G06F 17/30 | (2006.01) |
| G06F 21/62 | (2013.01) |

(52) U.S. Cl.
CPC .................................. *G06F 21/6209* (2013.01)
USPC ............... 713/189; 713/193; 726/26; 726/27; 726/28

(58) Field of Classification Search
CPC .................................................. G06F 21/6209
USPC .......................................... 713/189; 705/301
See application file for complete search history.

(56) References Cited

U.S. PATENT DOCUMENTS

| | | | |
|---|---|---|---|
| 6,393,125 B1 | 5/2002 | Barbir | |
| 7,184,947 B2 | 2/2007 | Matsuoka et al. | |
| 7,386,550 B2 | 6/2008 | Brun | |
| 7,640,583 B1 * | 12/2009 | Marinescu et al. | 726/22 |
| 2003/0055905 A1 * | 3/2003 | Nishiyama et al. | 709/206 |
| 2003/0081790 A1 * | 5/2003 | Kallahalla et al. | 380/281 |
| 2005/0050344 A1 * | 3/2005 | Hull et al. | 713/193 |
| 2005/0278529 A1 * | 12/2005 | Kano | 713/168 |
| 2006/0195778 A1 * | 8/2006 | Bendik | 715/500 |
| 2009/0112867 A1 | 4/2009 | Roy et al. | |
| 2009/0132552 A1 * | 5/2009 | Adya et al. | 707/10 |
| 2011/0022645 A1 * | 1/2011 | Maeda et al. | 707/822 |
| 2011/0150267 A1 * | 6/2011 | Snelling et al. | 382/100 |

OTHER PUBLICATIONS

Simske, Steven J. and Helen Balinsky, "APEX:Automated Policy Enforcement eXchange", Oct. 6, 2010.

* cited by examiner

*Primary Examiner* — Andrew Nalven
*Assistant Examiner* — Khang Do
(74) *Attorney, Agent, or Firm* — Mannava & Kang; Tim Kang

(57) ABSTRACT

In a method for managing information comprising a reference name of an atomic unit listed in a document serialization, a new name for the atomic unit reference name is generated and occurrences of the atomic unit reference name in the document serialization are replaced with the new name for the atomic unit to conceal the atomic unit reference name. In addition, a map file containing a map file entry for each of a plurality of workflow participants is generated, in which each of the map file entries includes the new name and an access key to access the atomic unit.

20 Claims, 6 Drawing Sheets

MANAGING INFORMATION IN A DOCUMENT SERIALIZATION

CROSS REFERENCE TO RELATED APPLICATIONS

The present application contains common subject matter with copending PCT Application Serial No.: PCT/US10/49638, entitled "Providing Differential Access to a Digital Document", filed on Sep. 21, 2010, and copending and commonly assigned U.S. patent application Ser. No. 12/949,510, entitled "Managing Access to a Secure Digital Document", filed on Nov. 18, 2010, the disclosures of which are hereby incorporated by reference in their entireties.

BACKGROUND

In recent years, there has been a growing trend to move away from printing information on paper and instead, to the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may easily be counterfeited.

Various techniques have been proposed to prevent or reduce attacks and counterfeiting of digital documents. These techniques typically employ a database, such as, but not limited to filesystem, Sharepoint, RAID devices, etc., upon which the digital documents are stored so that access to the database, or a network to which the database is connected, is controlled by preventing access to the database or network to a user unless that user possesses some secret information, such as, a user identification and password. As such, in order for these security techniques to enforce access control on the digital documents, users are required to be granted access to the database or network. However, access to the database or network is typically prohibited or undesirable for various security reasons, such as, to prevent access by contractors or non-employees of the corporate or government entity that owns the database or network. In addition, it is desirable for users to be granted access to the database or network securely.

Another technique for protecting the contents of digital documents is through encryption of the digital documents using various encryption and signature keys, such as in public-private cryptography. Although this form of protection has been found to be relatively effective, there are a number of issues pertaining to efficiently and securely distributing keys to enable a plurality of users to decrypt and verify the signatures of the encrypted digital documents.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
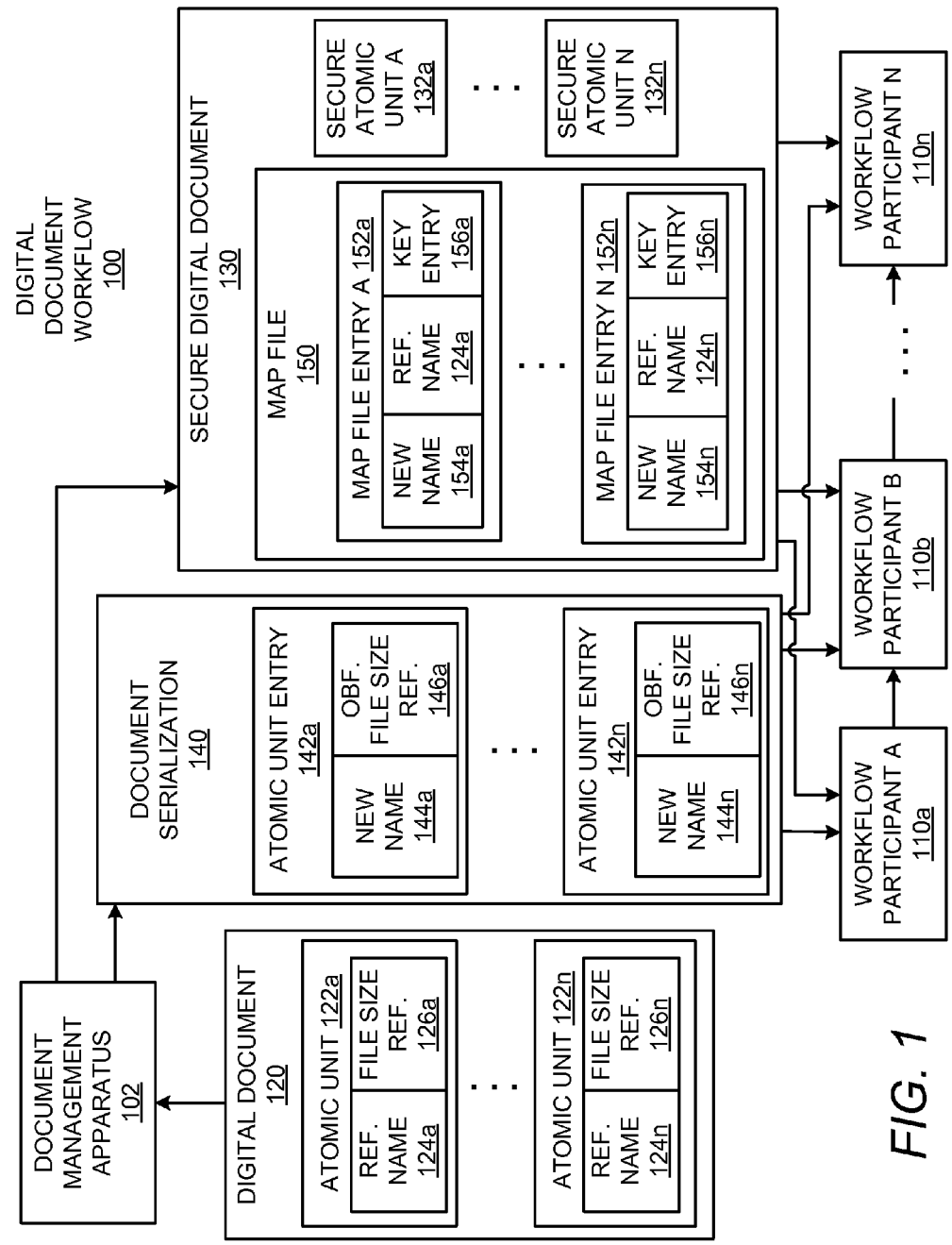
FIG. 1 illustrates a simplified diagram of a digital document workflow, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the term "n" following a reference numeral is intended to denote an integer value that is greater than 1. In addition, ellipses (". . .") in the figures are intended to denote that additional elements may be included between the elements surrounding the ellipses. Moreover, the terms "a" and "an" are intended to denote at least one of a particular element. As used herein, the term "includes" means includes but not limited to, the term "including" means including but not limited to. The term "based on" means based at least in part on.

Disclosed herein are a method and apparatus for managing information in a document serialization of a digital document. The digital document may comprise a composite document, which is composed of a variety of individual addressable and accessible parts (units) in the form of separate files or addressable file fragments. For example, the digital document itself and/or the units may include individual files, groups of files, or file fragments, such as, html fragments, xml nodes and elements, presentation slides, word processing text boxes, parts of a spreadsheet document, an electronic object containing drawings, an electronic object having flash video capabilities, etc. The individual addressable and accessible parts are recited as "atomic units" throughout the present disclosure. In addition, the atomic units of a particular digital document may comprise the same format or different formats from each other. The compositions of the atomic units in a digital document may vary during the lifecycle of the digital document. For instance, an atomic unit may be broken down into other atomic units or multiple atomic units may be combined into a single atomic unit as the digital document progress through a workflow.

Publicly Posted Composite Documents (PPCD), as well as other types of documents, are distributed by potentially non-secure channels, where the document contents (atomic units) together with their previous versions and subsequent revisions are easily accessible by unauthorized parties. PPCD are created from real data files and/or their fragments, which are likely to retain their identifying names and other related attributes and meta-data, which may provide some meaningful information. Layout engines and display agents may use this information, in particular identifying names, to present a serialization of a digital document to a workflow participant. Whilst the actual content of each part is normally protected from unauthorized access by industrial strength encryption and authentication requirements, some meaningful information about the document contents may still be determined by the identifying names and their file sizes, their changes in size over various subsequent versions, etc.

As discussed in greater detail herein below, the identifying information of the atomic units include, for instance, the file names of the atomic units, the types of the atomic units, and the file sizes of the atomic units. In addition, the number of workflow participants to which access to the digital document/atomic unit(s) is to be granted may be determined by, for instance, counting the number of map-file entries. In addition, various manners are disclosed below for concealing the true identifying information of the atomic units. Thus, for instance, the identifying information of the atomic units may not be discernable from merely viewing the concealed identifying information. Throughout the present disclosure, the term "obfuscate" is intended to mean, but not limited to, the concealment of an intended meaning, the making of a communication confusing, the making of a communication to be intentionally ambiguous, the making of a communication to be relatively difficult to interpret, etc.

Through implementation of the method and apparatus disclosed herein, the identifying information of the atomic units may be protected. More particularly, potentially sensitive filenames and paths within a digital document may be protected from being revealed to an unauthorized viewer/snooper. Moreover, an unauthorized viewer/snooper may be unable to discern the number of workflow participants who have been granted access to the atomic units or their identities. Accordingly, the method and apparatus disclosed herein provide a level of protection to the atomic units in addition to the encryption of the atomic units.

With reference first to FIG. 1, there is shown a simplified diagram of a digital document workflow 100, according to an example of the present disclosure. It should be readily apparent that the diagram depicted in FIG. 1 represents a generalized illustration and that other components may be added or existing components may be removed, modified or rearranged without departing from a scope of the digital document workflow 100.

The digital document workflow 100 is depicted as including a document management apparatus 102 and a plurality of workflow participants 110a-110n. The digital document workflow 100 is also depicted as including a digital document 120 containing a plurality of atomic units 122a-122n. In addition, each of the atomic units 122a-122n is depicted as including a respective reference name 124a-124n and file size reference 126a-126n. The reference names 124a-124n generally comprise identifiers assigned to the atomic units 122a-122n to enable the atomic units 122a-122n to be distinguished from each other and for users to quickly identify the contents of the atomic units 122a-122n. Thus, for instance, the reference names 124a-124n may comprise user-assigned file names for the atomic units 122a-122n. The file size references 126a-126n comprise the sizes of the atomic units 122a-122n, for instance, in kilobytes, megabytes, gigabytes, etc. The reference names 124a-124n and the file size references 126a-126n therefore comprise information pertaining to the atomic units 122a-122n that may be displayed in a computer file folder, directory, or other serialization of file information.

The digital document workflow 100 is also depicted as including a secure digital document 130 and a document serialization 140. The secure digital document 130 may comprise, for instance, an encrypted and signed version of the digital document 120. In addition, or alternatively, the secure digital document 130 may contain secure atomic units 132a-132n, which may comprise, for instance, encrypted and signed versions of the atomic units 122a-122n. The secure digital document 130/atomic units 132a-132n may be encrypted through use of at least one encryption key and may be signed through use of at least one signature key. In one example, the document management apparatus 102 encrypts and signs the digital document 120/atomic units 122a-122n. In another example, another apparatus (not shown) encrypts and signs the digital document 120/atomic units 122a-122n.

In the second example, various functions of the document management apparatus 102 may be performed by another apparatus in the digital document workflow 100. In this example, the document management apparatus 102 may merely perform functions pertaining to concealing information pertaining to the secure atomic units 132a-132n.

The secure digital document 130 is also depicted as including a map file 150. The map file 150 includes a plurality of map file entries 152a-152n, each of which is assigned to a particular workflow participant 110a-110n. Each of the map file entries 152a-152n includes the reference name 124a-124n of a secure atomic unit 132a-132n and a key entry 156a-156n containing a set of keys to enable the selected workflow participant 110a to be able to decrypt and access the secure atomic unit 132a-132n to which the workflow participant 110a has been granted such access. The respective sets of keys contained in the key entries 156a-156n may be based upon a determined type of access to be granted to each of the workflow participants 110a-110n to the secure atomic units 132a-132n as described in greater detail herein below. The map file entries 152a-152n are also depicted as including new names 154a-154n of the secure atomic units 132a-132n as also discussed in greater detail herein below.

The map file entries 152a-152n may be encrypted to thus substantially prevent unauthorized users from accessing the information contained in the map file entries 152a-152n. For instance, each of the map file entries 152a-152n may be encrypted using a symmetric key of a workflow participant 110a-110n and the symmetric keys may be encrypted respective ones of the public keys of the workflow participants 110a-110n. As such, the workflow participants 110a-110n may use their respective private keys to decrypt the encrypted symmetric keys that have been encrypted using their respective public keys to decrypt and access the map file entries 152a-152n to which they are to be granted access. The map file 150 and various manners in which the workflow participants 110a-110n may access the particular map file entries 152a-152n are discussed in greater detail herein below. In addition, although the map file 150 has been depicted as being contained within the secure digital document 130, it should be understood that the map file 150 may be stored in a separate medium without departing from a scope of the digital document workflow 100.

The document management apparatus 102 is to generate the document serialization 140 to contain concealed information pertaining to the secure atomic units 132a-132n. The document serialization 140 may comprise, for instance, a visible listing, such as, a directory, a table of contents, etc., containing information about the secure atomic units 132a-132n as well as information about the map file 150 in the secure digital document 130. Thus, by way of example in which the secure atomic units 132a-132n comprise files stored on a memory device, such as, but not limited to, a compact disk, a hard drive, a flash drive, etc., the document serialization 140 may comprise a directory of the memory device or folder on which the secure atomic units 132a-132n are stored. According to an example, the document serialization 140 may be encrypted through use of at least one encryption key and may be signed through use of at least one signature key to thus require a decryption key to view the contents of the document serialization 140. In one example, the document management apparatus 102 encrypts and signs the document serialization 140. In another example, another apparatus (not shown) encrypts and signs the document serialization.

The document serialization 140 is depicted as including a plurality of atomic unit entries 142a-142n. Each of the atomic unit entries 142a-142n contains information pertaining to respective ones of the secure atomic units 132a-132n. The information includes a new name 144a-144n and an obfuscated (obf.) file size reference 146a-146n. Each of the new names 144a-144n comprises a new name of an atomic unit reference name 124a-124n and may include a reference path entry that provides information pertaining to accessing a respective secure atomic unit 132a-132n. In this regard, the new names 144a-144n may comprise links, such as, hyperlinks, uniform resource locators, uniform resource identifiers, etc., to respective ones of the secure atomic units 132a-132n. In addition, each of the obfuscated file size references 146a-146n comprises an obfuscated file size reference 146a-146n of an atomic unit reference file size reference 126a-126n. Various manners in which the new names 124a-124n and the file size references 126a-126n are generated are discussed in greater detail herein below.

Generally speaking, therefore, the document serialization 140 conceals information pertaining to the secure atomic units 132a-132n. More particularly, the document management apparatus 102 conceals the reference names 124a-124n of the atomic units 122a-122n by generating new names 144a-144n for the reference names 124a-124n, and by replacing occurrences of the reference names 124a-124n with the new names in the secure document serialization 140. As such, the contents of the secure atomic units 132a-132n may not readily be identified by viewing the new names 144a-144n of the secure atomic units 132a-132n. In addition, the document management apparatus 102 obfuscates the file size references 126a-126n to thus prevent identification of which of the secure atomic units 132a-132n contains the most data and/or to conceal how the secure atomic units 132a-132n have changed as the secure digital document 130 is conveyed among the workflow participants 110a-110n.

The document management apparatus 102 may comprise a hardware device, such as, a computer, a server, a circuit, etc., configured to perform various functions in concealing at least one property of the secure digital document 130/atomic units 132a-132n. The various functions that the document protection apparatus 102 performs are discussed in greater detail herein below with respect to FIGS. 2 and 3.

The workflow participants 110a-110n generally represent computing devices through which the workflow participants 110a-110n may receive, and when granted sufficient access, to at least one of view, edit, and acknowledge the encrypted digital document 130/atomic unit(s) 132a-132n. The computing devices may comprise, for instance, personal computers, laptop computers, tablet computers, personal digital assistants, cellular telephones, etc.

According to an example, the document management apparatus 102 may be in a secure environment where the digital document owner/creator/master has access to the document management apparatus 102, and some or all the computing devices of the workflow participants 110a-110n are outside of the secure environment. In other words, some or all of the workflow participants 110a-110n may not access the secure digital document 130/atomic unit(s) 132a-132n from a common database that controls access to the secure digital document 130/atomic unit(s) 132a-132n. Instead, the secure digital document 130/atomic unit(s) 132a-132n may be supplied to and among the workflow participants 110a-110n through, for instance, e-mail, a shared server, direct file transfer, removable storage medium, etc. Some or all of the workflow participants 110a-110n may not be granted access to the secure environment of the document management apparatus 102, for instance, in situations where such access is impractical or prohibited.

The digital document 120 may comprise any reasonably suitable type of a document in a digital form and may comprise one or more digital documents, which may be in the same or different formats with respect to each other. Examples of suitable document types include, for instance, portable document format, spreadsheet, JPEG or any other image, word processing document, hypertext markup language (html), etc. In addition, the atomic units 122a-122n generally comprise individual addressable elements within the digital document 120, such as, signature lines, cells or columns within a spreadsheet, paragraphs, graphics boxes, etc.

The secure digital document 130 may be supplied by the first workflow participant 110a to a second workflow participant 110b, for instance, by the first workflow participant e-mailing the digital document to the second participant or by mailing a CD containing the digital document, etc., by the second workflow participant 110b to a third workflow participant 110c, and so forth. Alternatively, the secure digital document 130 may be retrieved by the workflow participants 110a-110n. According to an example, the order in which the secure digital document 130 is supplied between at least some of the workflow participants 110a-110n is predetermined. In another example, the order in which the workflow participants 110a-110n access the secure digital document 130 may not be predetermined. In addition, because the document management apparatus 102 may be inside of some secure environment of a document master/owner/creator and at least some of the workflow participants 110a-110n are outside of the common secure environment, the document management apparatus 102 need not be involved in the supply and/or retrieval of the secure digital document 130 by the workflow participants 110b-110n following the first communication of the secure digital document 130 to the first workflow participant 110a.

Figure 2:
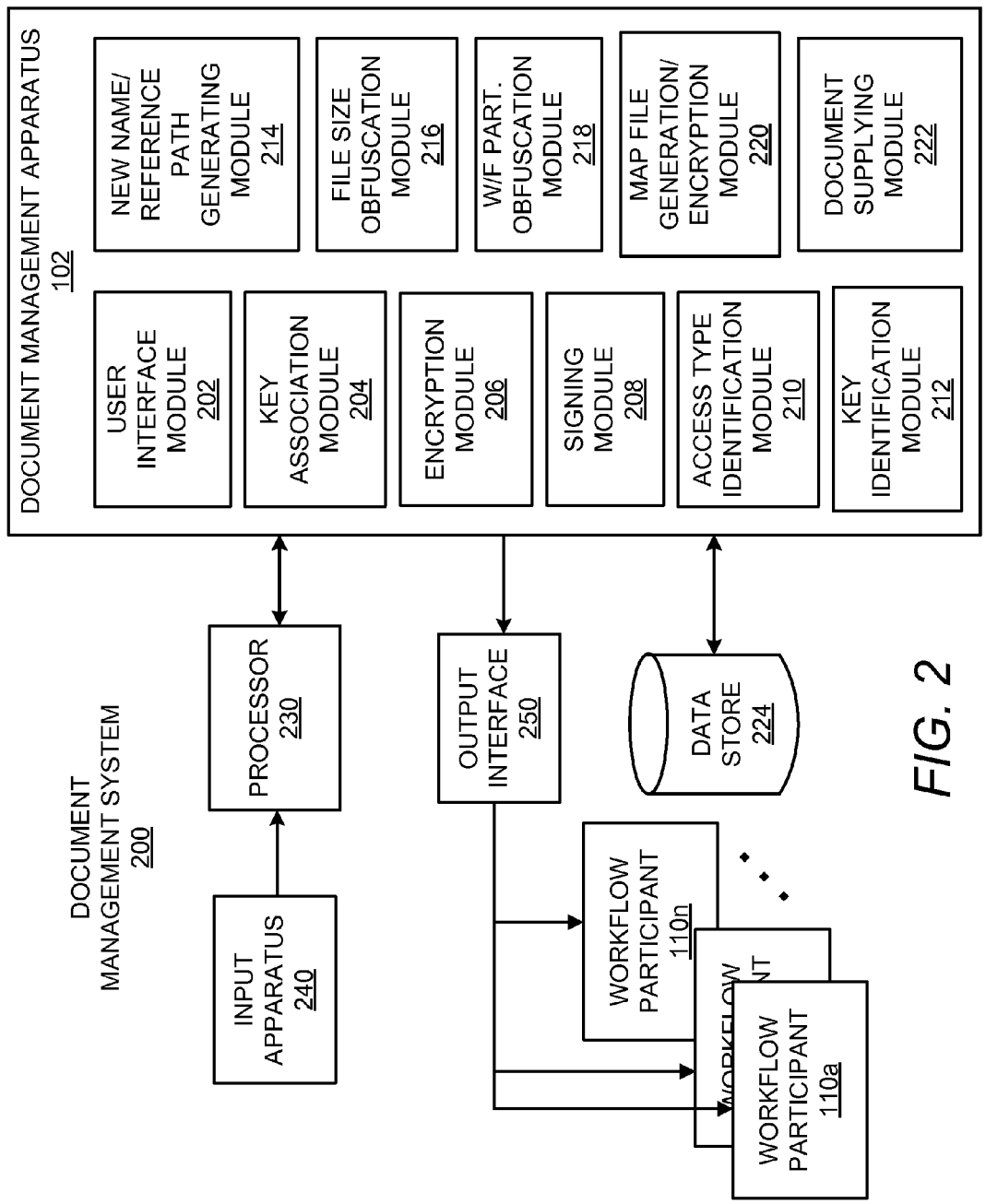
FIG. 2 shows a simplified block diagram of a document management system containing the document management apparatus depicted in FIG. 1, according to an example of the present disclosure.

With particular reference now to FIG. 2, there is shown a simplified block diagram of a document management system 200 containing the document management apparatus 102 depicted in FIG. 1, according to an example. It should be apparent that the block diagram depicted in FIG. 2 represents a generalized illustration and that other components may be added or existing components may be removed, modified or rearranged without departing from a scope of the document obfuscation control system 200.

As shown in FIG. 2, the document management apparatus 102 includes a user interface module 202, a key association module 204, an encryption module 206, a signing module 208, an access type identification module 210, a key identification module 212, a new name/reference path generating module 214, a file size obfuscation module 216, a workflow participant obfuscation module 218, a map file generation/ encryption module 220, and a document supplying module 222. The modules 202-222 may comprise modules containing machine-readable instructions, hardware modules, or a combination of modules containing machine-readable instructions and hardware modules. Thus, in one example, one or more of the modules 202-222 comprise circuit components. In another example, one or more of the modules 202-222 comprise machine-readable instructions stored on a computer readable storage medium, which a processor may execute.

In any regard, a processor 230 is to implement and/or execute the document management apparatus 102. Thus, for instance, the document management apparatus 102 may comprise an integrated and/or add-on hardware device of a computing device comprising the processor 230. As another example, the document management apparatus 102 may comprise a computer readable storage device upon which machine readable instructions for each of the modules 202-222 is stored and executed by the processor 230.

As further shown in FIG. 2, the processor 230 is configured to receive input from an input apparatus 240. The input apparatus 240 may comprise, for instance, a user interface through which a user may input instructions into the document management apparatus 102. The input apparatus 240 may also comprise a user interface through which a user may define access types to be granted to the secure digital document 130/atomic unit(s) 132a-132n to each of the workflow participants 110a-110n.

The document management system 200 also includes an output interface 250 through which the secure digital document 130/atomic units 132a-132n, map file 150, and document serialization 140 may be supplied to one or more of the workflow participants 110a-110n.

The secure digital document 130/atomic units 132a-132n, map file 150, and/or the document serialization 140 may be stored in a data store 224 prior to delivery to the workflow participants 110a-110n. The data store 224 may comprise volatile and/or non-volatile memory, such as DRAM, EEPROM, MRAM, phase change RAM (PCRAM), Memristor, flash memory, and the like. In addition, or alternatively, the data store 224 may comprise a device configured to read from and write to a removable media, such as, a floppy disk, a CD-ROM, a DVD-ROM, or other optical or magnetic media.

Figure 3A:
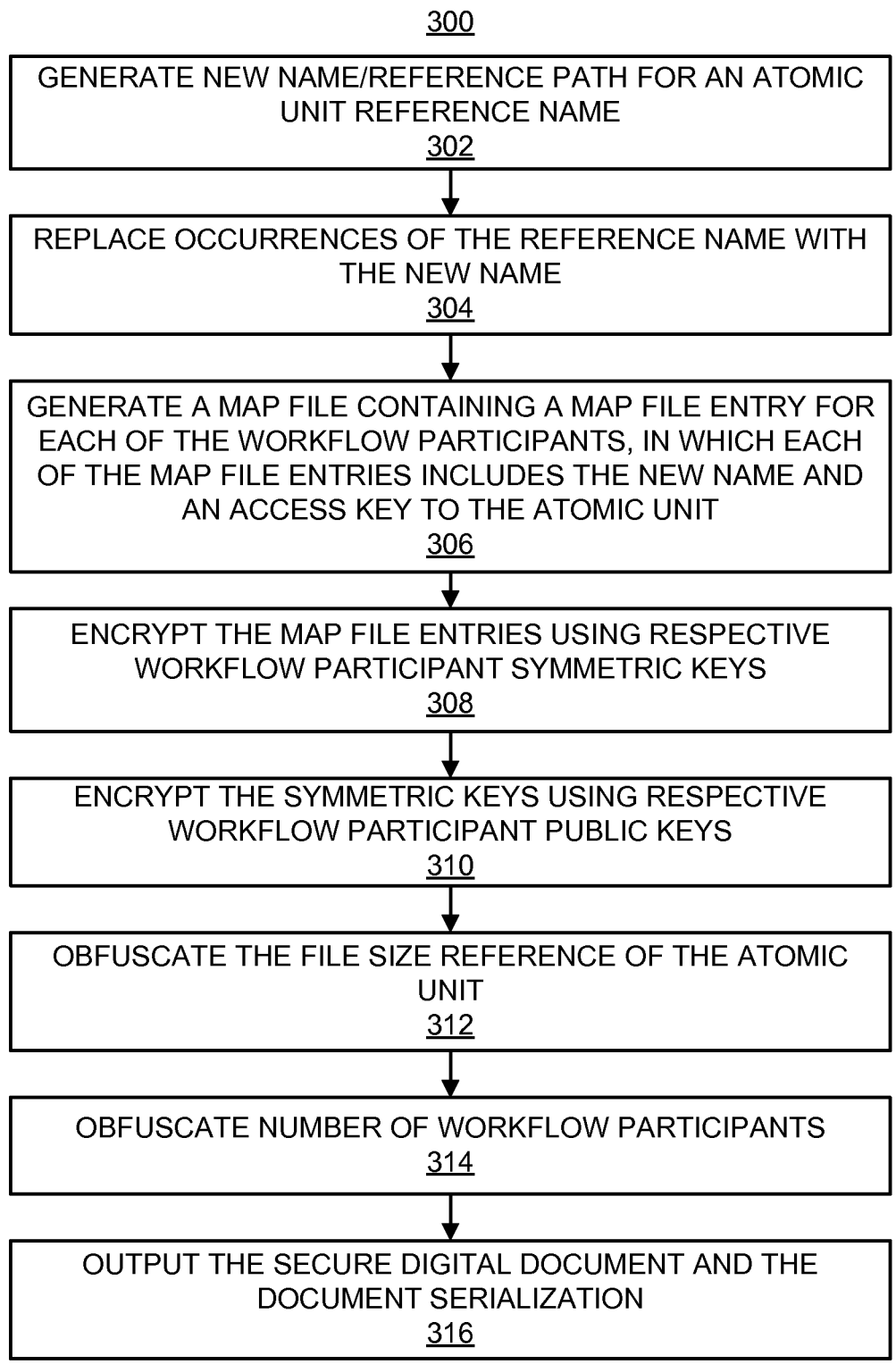
FIGS. 3A and 3B, respectively show flow diagrams of methods for managing information in a document serialization, according to an example of the present disclosure.
Figure 3B:
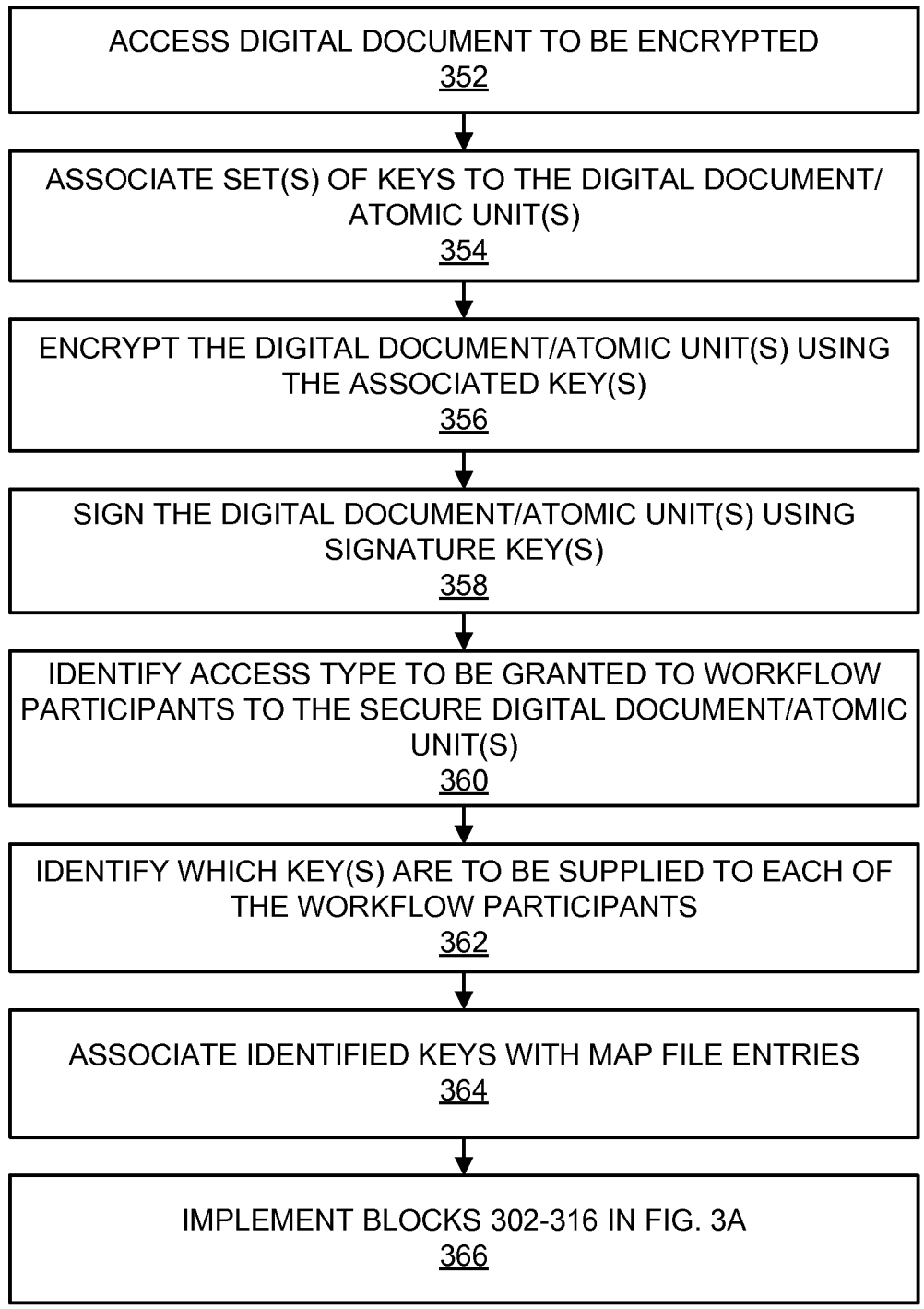

Various manners in which the modules 202-222 of the document management apparatus 102 may be implemented are described in greater detail with respect to FIGS. 3A and 3B, which respectively depict flow diagrams of methods 300 and 350 for managing information in a document serialization 140, according to an example of the present disclosure. It should be apparent that the method 300 and 350 represent generalized illustrations and that other processes may be added or existing processes may be removed, modified or rearranged without departing from the scopes of the methods 300 and 350.

The descriptions of the methods 300 and 350 are made with particular reference to the document management apparatus 102 depicted in FIGS. 1 and 2. It should, however, be understood that the methods 300 and 350 may be implemented in an apparatus that differs from the document management apparatus 102 without departing from the scopes of the methods 300 and 350.

At block 302, a new name/reference path 144a for an atomic unit reference name 124a is generated, for instance, by the new name/reference path generating module 214. The new name/reference path generating module 214 may generate the new name 144a for the atomic unit reference name 124a in any of a variety of manners.

In a first example, the new name/reference path generating module 214 randomly generates the new name/reference path 144a of the secure atomic unit 132a. In addition, the new name/reference path generating module 214 may generate the new name/reference path 144a to have a pattern that is identical to a pattern of the reference name 124a. In another example, the new name/reference path generating module 214 generates the new name/reference path 144a to be part of a sequential list of meaningless names, such as, "part21" for the $21^{st}$ part of a document.

As discussed above, the new name/reference path generating module 214 may also generate a new reference path for the secure atomic unit 132a. The new name/reference path generating module 214 may generate the new reference path by replacing the reference name 124a with the new name 144a in a path of a directory leading to the atomic unit 122a. The reference path may comprise, for instance, a hyperlink to the secure atomic unit 132a, which may include, for instance, a local area network (LAN) address, a wide area network (WAN) address, a uniform resource locator (URL), a secure store, etc. The new name/reference path generating module 214 may generate the new reference path for the secure atomic unit 132a in any of the manners discussed above with respect to the reference path of the secure atomic unit 132a.

At block 304, occurrences of the reference name/reference path 124a are replaced in the document serialization 140 with the new name/reference path 144a generated at block 302, for instance, by the new name/reference path generating module 214. More particularly, for instance, the new name/reference path generating module 214 may replace the real reference path in the document serialization 140, which may include, for instance, the entry-name in a zip archive, while preserving its contents. Moreover, the new name/reference path generating module 214 may scan all of the parts of the secure digital document 130/atomic units 132a-132n for references to the atomic unit reference name/reference path 124a and may replace those references with the new name/reference path 144a.

At block 306, a map file 150 containing a map file entry 152a-152n for each of a plurality of workflow participants 110a-110n is generated, in which, each of the map file entries 152a-152n includes a new name/reference path 154a and an access key (key entry 156a-156n) to access the secure atomic unit 132a, for instance, by the map file generating/encryption module 220. The map file generating/encryption module 220 may generate a separate map file entry 152a-152n for each of the workflow participants 110a-110n to thus provide each of the workflow participants 110a-110n with the ability to access a particular secure atomic unit 132a-132n. In addition, or alternatively, the map file generating/encryption module 220 may generate a separate map file entry 152a-152n for each of the secure atomic units 132a-132n, such that, the workflow participants 110a-110n that have been granted the ability to access particular ones of the secure atomic units 132a-132n are able to access the respective ones of the map file entries 152a-152n.

At block 308, the map file entries 152a-152n are encrypted using respective workflow participant symmetric keys, for instance, by the map file generating/encryption module 220. Thus, for instance, the first map file entry 152a may contain the new name 154a associated with the reference name 124a of a first secure atomic unit 132a that is to be accessed by a first workflow participant 110a. In this example, the first map file entry 152a is encrypted using a symmetric key generated or derived for the first workflow participant 110a, such that, the first workflow participant 110a is able to decrypt the first map file entry 152a and use the access key in the key entry 156a to decrypt the first secure atomic unit 132a. This process may be repeated for the remaining map file entries 152b-152n.

At block 310, the symmetric keys of the workflow participants 110a-110n are encrypted using the respective public keys of the workflow participants 110a-110n, for instance, by the map file generation/encryption module 220. As shown in Table I below, various encryption keys are employed to prevent unauthorized access to the map file entries 152a-152n. In Table I, an example of a manner in which encryption keys are assigned to two workflow participants is provided. In addition, each row corresponds to a particular workflow participant.

| column 1 | column 2 | column 3 | column 4 |
|---|---|---|---|
| $Enc_{K1}(S1)$ | $Enc_{S1}(p1)$ | string p1 | $Enc_{S1}$ (map-file2343) |
| $Enc_{K2}(S2)$ | $Enc_{S2}(p2)$ | string p2 | $Enc_{S2}$ (map-file39873) |

As shown in Table I, identity strings p1, p2, etc., are selected for the workflow participants 110a-110n. The identity strings p1, p2, etc., may be the same or differ for each of the workflow participants 110a-110n. In addition, the identity strings p1, p2, etc., may be pre-defined, previously agreed upon, randomly generated, etc.

In addition, Table I shows that one symmetric key (S1, S2, . . . ) is generated and assigned for each workflow participant 110a, 110b. The symmetric keys are different for each workflow participant 110a-110n to avoid collision and meet accepted security standards for the policies governing the digital document (for instance, the advanced encryption standard (AES)). Using this symmetric keys, the map-file entries 152a-152n (and the map-file 150 itself) are encrypted, as shown in column 4 of Table I. In addition, using this symmetric keys, the corresponding identity strings p1, p2, etc., are encrypted, as shown in column 2 of the Table I. Moreover, each symmetric key (S1, S2, . . . ) is encrypted using the known Public Key (PK) of the corresponding workflow participant (Ki).

In one regard, each of the map file entries 152a-152n may be encrypted using a public key of a workflow participant 110a-110n who is intended to access the keys contained therein. Through control of the encryption of the key entries, therefore, access to the secure digital document/atomic unit(s) may be controlled. More particularly, for instance, the map file generation/encryption module 220 may generate the map file entries 152a-152n to include respective sets of keys based upon the types of access to the secure atomic units 132a-132n that the workflow participants 110a-110n have been granted access.

At block 312, the file size reference 126a of the secure atomic unit 132a is obfuscated to generate an obfuscated file size reference 146a, for instance, by the file size obfuscation module 218. The obfuscated file size reference 146a may replace the file size reference 126a of the secure atomic unit 132a in the document serialization 140, as depicted in FIG. 1. The file size obfuscation module 218 may obfuscate the file size reference 126a of the secure atomic unit 132a through any of a variety of manners. In a first example, the file size obfuscation module 218 obfuscates the file size reference 126a by inserting filler data into the secure atomic unit 132a to increase the file size of the secure atomic unit 132a. The filler data may be of sufficiently large size to cause the increase in file size to be sufficiently larger than a relevant size alteration of the secure atomic unit 132a that may be useful to a snooper. In addition, the filler data may be of a relatively smaller size than the file size reference 126a, for instance, several times smaller than the file size reference 126a.

In another example, the file size obfuscation module 218 obfuscates the file size reference 126a by one of adding and removing data from the secure atomic unit 132a. In this example, parts of the data of the secure atomic unit 132a may be stored outside of the secure digital document 130. For instance, some percentage of the parts of the secure atomic unit 132a may be stored in a secure location through a secure link, such as, through a link within a protected or secure environment. In this regard, the file reference size 126a of the secure atomic unit 132a may be maintained at the same level regardless of data that is added to or removed from the secure atomic unit 132a as the secure digital document 130 progresses through a workflow.

By way of example in which the file size reference 126a is nominally 200 kB and may be increased to 800 kB when completed, the step size of 400 kB for the filler data may be required to keep snooping from being informative. In another example in which the file size is nominally 400 kB, a file size increase or decrease of 100 kB may be sufficient to keep snooping from being informative. As a further example, smaller step sizes may be used when the differential change in file size (for the files worth snooping) is dependent on different choices in editing. As a yet further example, the increase or decrease in file size may be selected (for files worth snooping) to be several times the maximum document size difference.

At block 314, the number of workflow participants 110a-110n to be granted access to the secure atomic units 132a-132n is obfuscated by generating a pseudo map file entry, in which the pseudo-map file entry has no association with any of the plurality of workflow participants 110a-110n, for instance, by the workflow (W/F) obfuscation module 218. The W/F obfuscation module 218 may generate the pseudo-map file entry to hide the actual number of workflow participants 110a-110n that are to receive the map files entries 152a-152n.

At block 316, the secure digital document 130 and the document serialization 140 are output, for instance, by the document supplying module 222. The document supplying module 222 may also output the map file 150 with the secure digital document 130 or as a separate file. In addition, the document supplying module 222 may output the secure digital document 130, the document serialization 140, and the map file 150 to a workflow participant 110a and/or to the data store 224.

Turning now to FIG. 3B, the flow diagram of the method 350 pertains to managing information in a document serialization 140, according to another example. At block 352, a digital document 120 that is to be placed into a workflow among a plurality of workflow participants 110a-110n is accessed. For instance, the access management apparatus 102 receives the digital document 120 from the input apparatus 240 through the user interface module 202. As another example, a user instructs the document management apparatus 102 to access the digital document 120 from, for instance, the data store 224. As another example, a new digital document 120 is created from a template, such as, for instance, an application form process.

At block 354, a first set of keys is associated with the atomic units 122a-122n, for instance, by the key association module 204. The first set of keys includes an encryption key, or alternatively a pair of encryption-decryption keys, and a pair of a signature and a verification keys. In addition, although not explicitly shown in FIG. 3B, separate sets of keys may be associated with the atomic units 122a-122n. In addition, for the atomic units 122a-122n that contain no sensitive or private material, the set of keys may only include a signature-verification pair. Moreover, a first set of keys may be associated with a plurality of atomic units 122a-122n to, for instance, grant the same type of access to the atomic units 122a-122n associated with the first set of keys to a workflow participant 110a.

At block 356, the atomic units 122a-122n are encrypted using an encryption key contained in the associated set(s) of keys, for instance, by the encryption module 206. The encryption module 206 may use any standard or proprietary encryption mechanism, such as, for instance, symmetric AES encryption, Twofish encryption, Blowfish encryption, asymmetric RSA, etc., to encrypt the atomic units 122a-122n. According to an example, each of the atomic units 122a-122n that are to be provided with differential access types may be encrypted using respective specially generated, derived and/or assigned encryption keys. In addition, the atomic units 122a-122n may be encrypted using different encryption keys to therefore enable enforcement of differential access to the atomic units 122a-122n.

At block 358, the encrypted atomic units 122a-122n are signed using a signature key, contained in the associated set(s) of keys for the encrypted atomic units 122a-122n, for instance, by the signing module 208. The signing module 208 may sign the encrypted atomic units 122a-122n through use of, for instance, a Digital Signature Algorithm, RSA based signatures, etc. According to an example, each of the encrypted atomic units 122a-122n that have been encrypted is signed using a specially assigned, generated or derived signature key.

At block 360, access types to the secure atomic units 132a-132n to be granted to each of the workflow participants 110a-110n are identified, for instance, by the access type identification module 210. More particularly, for instance, the access type identification module 210 may track instructions received through the user interface module 202 from the input apparatus 240 that identify the workflow participants 110a-110n that are to receive the secure digital document 130 as well as the differential access rights to be granted to each of the workflow participants 110a-110n to the secure atomic units 132a-132n. In addition, the access type identification module 210 may store the information received from the input apparatus 240 in the data store 224. In another example, access types to be granted to the secure atomic units 132a-132n may be stored in the data store 224 and the access type identification module 210 may access the data store 224 to retrieve the access type information.

According to an example, the workflow participants 110a-110n may be granted one of a "no access" type, a "read only access" type, and a "modify access" type to each of the secure atomic units 132a-132n. As such, for instance, a workflow participant 110a may be granted different types of access to the secure atomic units 132a-132n. In addition, a first workflow participant 110a may be granted a different type of access to the secure atomic units 132a-132n than a second workflow participant 110b.

For secure atomic units 132a-132n under the "no access" type, a workflow participant 110a is granted the ability to receive the secure atomic units 132a-132n, but is not granted the ability to open or otherwise read or modify these secure atomic units 132a-132n. As such, for instance, the workflow participant 110a may access the secure atomic units 132a-132n to which the workflow participant 110a has been granted the "no access" type, but may not be able to read or modify those secure atomic units 132a-132n. This workflow participant 110a may, however, be required to authenticate the secure atomic units 132a-132n to which the workflow participant 110a has been granted the "no access" type as well as all other ones of secure atomic units 132a-132n. This situation may occur, for instance, when the workflow participant 110a has been granted access to view a secure atomic unit 132a, but has not been granted access to view other ones of the secure atomic units 132b-132n. The workflow participant 110a may then be required to transfer the secure atomic units 132a-132n to one or more subsequent workflow participants 110b-110n who may have been granted access rights to those secure atomic units 132a-132n that are inaccessible by the workflow participant 110a.

For secure atomic units 132a-132n under the "read only access" type, a workflow participant 110a is granted the ability to open and access the secure atomic units 132a-132n to which the workflow participant 110a has been granted the "read only access" type. However, the workflow participant 110a is not authorized to modify those secure atomic units 132a-132n. In one regard, a workflow participant 110b that receives the secure atomic units 132a-132n may determine, and must automatically verify on reception, when the secure atomic units 132a-132n have been modified by an unauthorized workflow participant 110a, as discussed in greater detail herein below.

For secure atomic units 132a-132n under the "modify access" type, a workflow participant 110a is granted the authorization to both read and modify the secure atomic units 132a-132n to which the workflow participant 110a has been granted the "modify access" type. In one regard, the workflow participant 110a may be supplied with corresponding signature keys to enable the workflow participant 110a to sign some or all of the secure atomic units 132a-132n following modification and encryption of the secure atomic units 132a-132n. In addition, a second workflow participant 110b identified to receive the secure atomic units 132a-132n from a first workflow participant 110a may have been provided with an appropriate verification key in their respective map file entry 152n, which the second workflow participant 110b may use to determine whether the first workflow participant 110a was authorized to modify the secure atomic units 132a-132n. The second workflow participant 110b, if granted at least the read only access, may also be provided with an appropriate decryption key in the map file entry 152b to be able to decrypt the modified secure atomic units 132a-132n.

Various examples of the different types of keys associated with the different types of access are discussed in greater detail herein below with respect to FIG. 4.

At block 362, an identification of which keys are to be supplied to each of the workflow participants 110a-110n for the secure atomic units 132a-132n is made based upon the identified type of access, for instance, by the key identification module 212. Thus, for instance, for a first secure atomic unit 132a, a first workflow participant 110a and a second workflow participant 110b may be identified to receive the same set of keys. As another example, for a second secure atomic unit 132b, the first workflow participant 110a may be determined to receive a different set of keys from the second workflow participant 110b, and so forth. As such, multiple workflow participants 110a-110n may be given different types of access to the same secure atomic units 132a-132n.

According to an example, for those secure atomic units 132a-132n that workflow participants 110a-110n are to be granted the "no access" type, the key identification module 212 may determine that those workflow participants 110a-110n are to receive the verification keys for those secure atomic units 132a-132n without the encryption or signature keys for those secure atomic units 132a-132n. For those secure atomic units 132a-132n that workflow participants 110a-110n are to be granted the "read only access" type, the key identification module 212 may determine that those workflow participants 110a-110n are to receive the decryption keys and the verification keys, without the encryption and signature keys. For those secure atomic units 132a-132n that workflow participants 110a-110n are to be granted the "modify access" type, the key identification module 212 may determine that those workflow participants 110a-110n are to receive the encryption keys, the verification keys and the signature keys for those secure atomic units 132a-132n.

At block 364, the identified keys are associated with map file entries 152a-152n to be inserted into a map file 150, for instance, by the map file generation module 214. More particularly, the map file generation/encryption module 220 may insert the keys used to encrypt the secure atomic units 132a-132n into respective key entries 156a-156n.

At block 366, blocks 302-316 from FIG. 3A are implemented to generate the document serialization 140 and the map file 150 using the associated keys in the map file entries 156a-156n.

Figure 4:
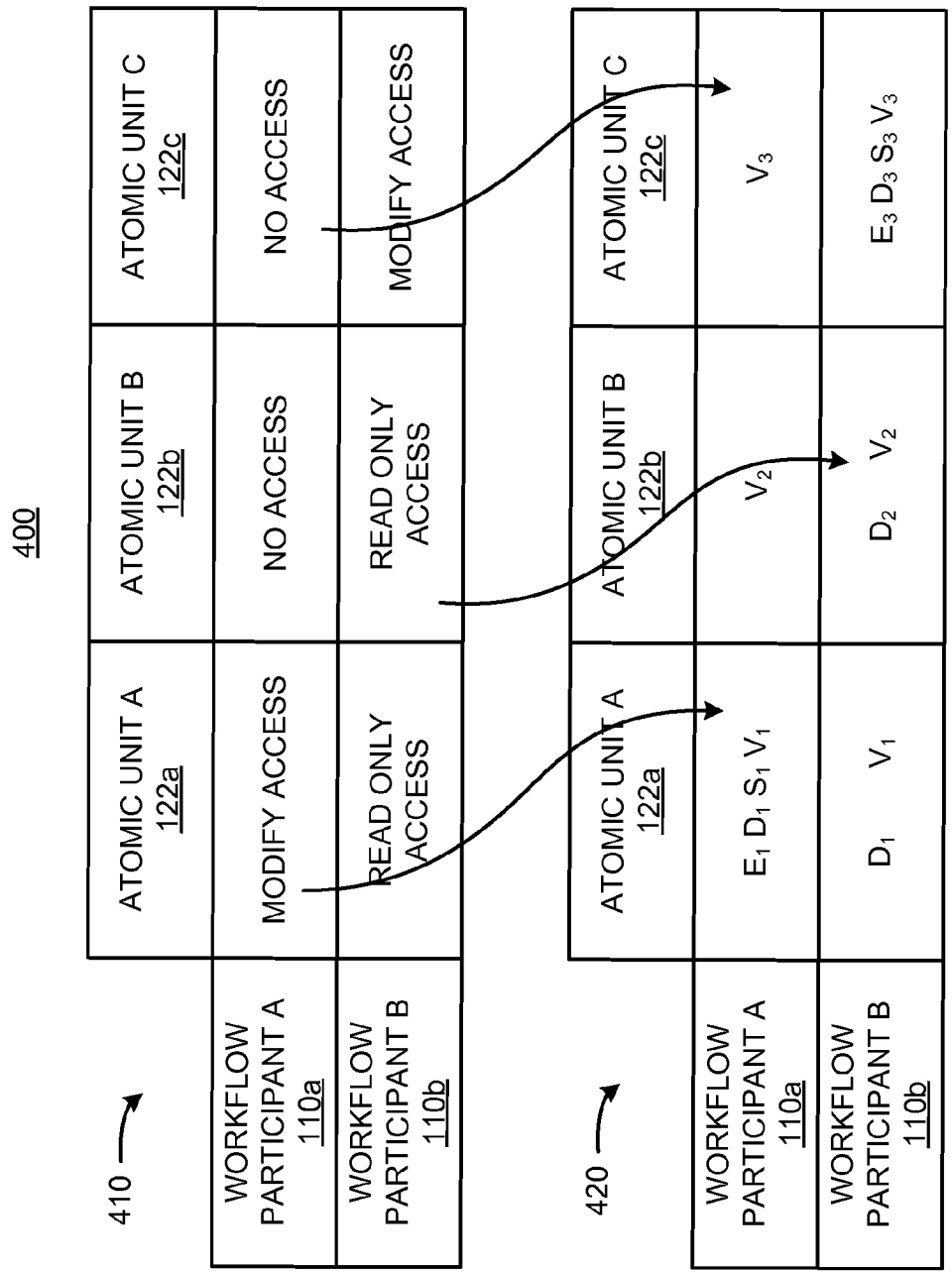
FIG. 4 shows a diagram of a manner in which differential access is provided to multiple workflow participants, according to an example of the present disclosure.

Turning now to FIG. 4, there is shown a diagram 400 of a manner in which differential access may be provided to multiple workflow participants 110a and 110b, according to an example. It should be understood that the diagram 400 is a generalized illustration and that other elements may be included therein without departing from a scope of the diagram 400. Thus, for instance, although two workflow participants 110a and 110b have been depicted in the diagram 400, it should be understood that various principles disclosed therein may be applied to any number of workflow participants 110c-110n. It should be understood that the various keys discussed in the diagram 400 may be included in the map files 152a-152n for the respective workflow participants 110a-110n.

The diagram 400 includes two charts 410 and 420. Both of the charts 410 and 420 depict a simple case of two workflow participants 110a and 110b and three atomic units 122a-122c. The first chart 410 depicts an example of the access types that each of the workflow participants 110a and 110b is provided to each of the atomic units 122a-122c. The second chart 420 depicts the corresponding sets of keys supplied to the workflow participants 110a and 110b based upon the type of access that the workflow participants 110a and 110b have been granted for each of the atomic units 122a-122c. In the example depicted in FIG. 4, the first workflow participant 110a has been granted the "modify access" type to the first atomic unit 122a and a "no access" type to the second and third atomic units 122b and 122c. In addition, the second workflow participant 110b has been granted the "read only access" type to the first and second atomic units 122a and 122b and the "modify access" type to the third atomic unit 122c.

As shown in the second chart 420, for the first atomic unit 122a, the first workflow participant 110a is supplied with encryption and decryption keys ($E_1, D_1$) and the signature and verification keys ($S_1, V_1$) for that atomic unit 122a. In addition, the second workflow participant 110b is supplied with just the decryption and verification keys ($D_1, V_1$) for the first atomic unit 122a. For the second and third atomic units 122b and 122c, the first workflow participant 110a is supplied with just the verification keys ($V_2, V_3$) for those atomic units 122b and 122c. For the second atomic unit 122b, the second workflow participant 110b is supplied with the decryption and verification keys ($D_2, V_2$) for that atomic unit 122b. For the third atomic unit 122c, the second workflow participant 110b is supplied with the encryption and decryption keys ($E_3, D_3$) and the signature and verification keys ($S_3, V_3$) for that atomic unit 122c.

In instances where the second workflow participant 110b is intended to access the first atomic unit 122a following modification by the first workflow participant 110a, the second workflow participant 110b is supplied with a second set of keys to be able to authenticate the modification to the at least one atomic unit 122a by the first workflow participant 110a. The second set of keys may differ from the first set of keys to thus enable the second workflow participant 110b to verify the signature of the first workflow participant 110a.

Some or all of the operations set forth in the figures may be contained as a utility, program, or subprogram, in any desired computer readable storage medium. In addition, the operations may be embodied by computer programs, which may exist in a variety of forms both active and inactive. For example, they may exist as machine readable instruction(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
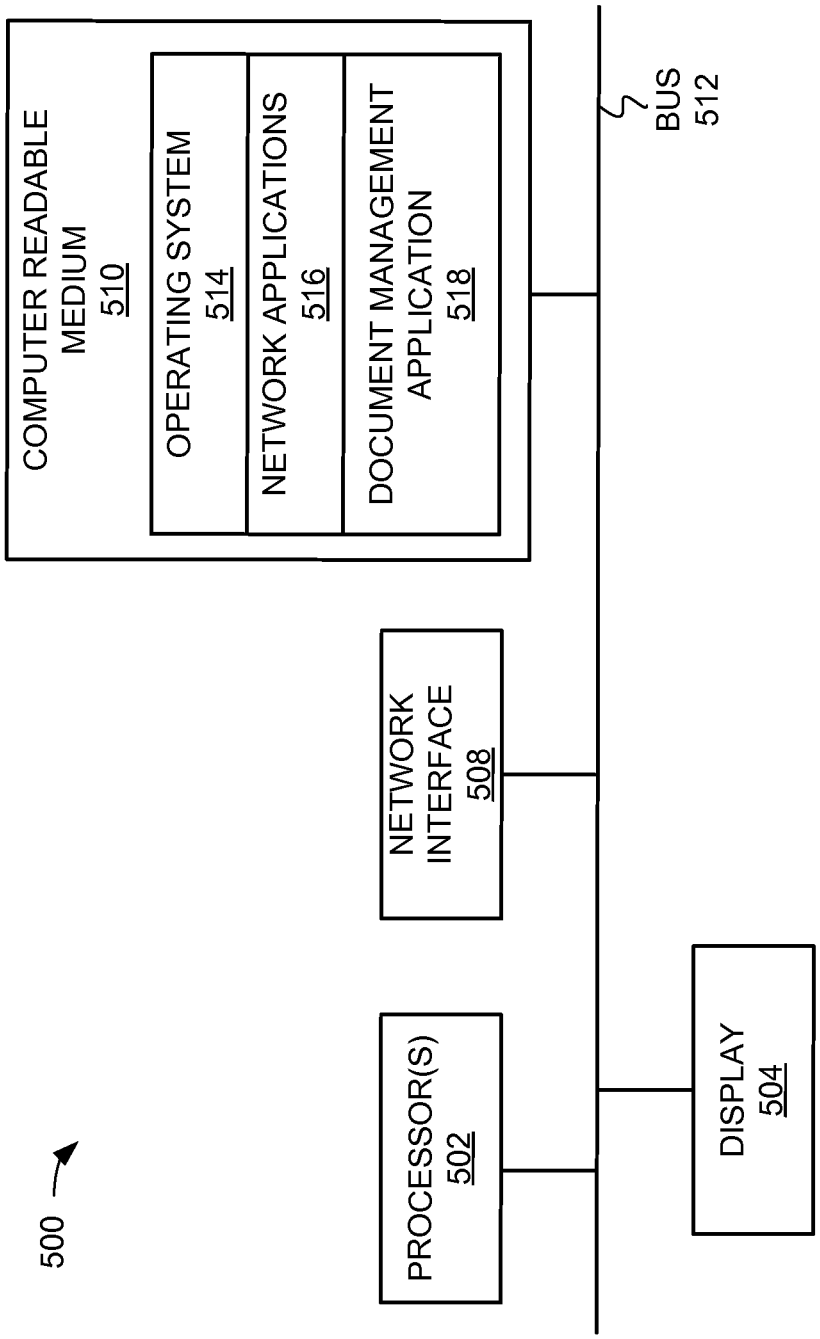
FIG. 5 shows a block diagram of a computer system that may be used as a platform for implementing or executing the methods depicted in FIGS. 3A and 3B, according to an example of the present disclosure.

Turning now to FIG. 5, there is shown a schematic representation of a computing device 500 configured in accordance with examples of the present disclosure. The device 500 includes a processor 502, such as a central processing unit; a display device 504, such as a monitor; a network interface 508, such as a Local Area Network LAN, a wireless 802.11x LAN, a 3G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other machine readable instructions, including word processors, browsers, email, Instant Messaging, media players, and telephony machine-readable instructions.

The computer-readable medium 510 may also store an operating system 514, such as Mac OS, MS Windows, Unix, or Linux; network applications 516; and a document management application 518. The operating system 514 may be multi-user, multiprocessing, multitasking, multithreading, real-time and the like. The operating system 514 may also perform basic tasks such as recognizing input from input devices, such as a keyboard or a keypad; sending output to the display 504; keeping track of files and directories on the computer readable medium 510; controlling peripheral devices, such as disk drives, printers, image capture device; and managing traffic on the bus 512. The network applications 516 include various components for establishing and maintaining network connections, such as machine readable instructions for implementing communication protocols including TCP/IP, HTTP, Ethernet, USB, and FireWire.

The document management application 518 provides various components for managing information in a document serialization, as described above. In certain examples, some or all of the processes performed by the application 518 may be integrated into the operating system 514. In certain examples, the processes may be at least partially implemented in digital electronic circuitry, or in computer hardware, machine readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims—and their equivalents—in which all terms are mean in their broadest reasonable sense unless otherwise indicated.

What is claimed is:

1. A method for managing information in a document serialization, said information comprising a reference name of an atomic unit listed in the document serialization, said method comprising:
    generating a new name for the atomic unit reference name;
    replacing occurrences of the atomic unit reference name in the document serialization with the new name for the atomic unit to conceal the atomic unit reference name;
    generating, using a processor, a map file in a secure digital document, said map file containing a map file entry for each of a plurality of workflow participants, wherein each of the map file entries includes the new name and an access key to access the atomic unit, wherein each of the plurality of workflow participants is associated with a respective symmetric key, and wherein the secure digital document is an encrypted and signed version of a digital document containing the atomic unit; and
    encrypting each of the map file entries using a respective symmetric key of the workflow participants.

2. The method according to claim 1, further comprising:
    determining which of the plurality of workflow participants are granted access to view the atomic unit reference name; and
    generating the map file entries for those workflow participants authorized to view the atomic unit reference name to further include a correlation between the new name and the atomic unit reference name and a reference path to the atomic unit.

3. The method according to claim 1, wherein the information also comprises a reference path of the atomic unit, said method further comprising:
    generating a new reference path of the atomic unit; and
    replacing occurrences of the reference path in the document serialization with the new reference path of the atomic unit to conceal the atomic unit reference path.

4. The method according to claim 1, further comprising:
    replacing an occurrence of the atomic unit reference name in another atomic unit with the new name of the atomic unit.

5. The method according to claim 1, wherein generating the new name for the atomic unit further comprises one of generating the new name randomly and as a part of a sequential list of meaningless names.

6. The method according to claim 1, wherein each of the plurality of workflow participants is associated with a respective public key, said method further comprising:
    encrypting the symmetric keys using public keys of the workflow participants.

7. The method according to claim 1, wherein said information in the document serialization includes a file size reference of the atomic unit, said method further comprising:
    obfuscating the file size reference of the atomic unit.

8. The method according to claim 7, wherein obfuscating the file size reference of the atomic unit further comprises inserting filler data into the atomic unit to increase the file size of the atomic unit.

9. The method according to claim 7, wherein obfuscating the file size reference of the atomic unit further comprises one of removing data from and adding data to the atomic unit to vary the file size of the atomic unit.

10. The method according to claim 1, further comprising:
    obfuscating a number of the plurality of workflow participants identified in the map file by generating a pseudo map file entry, wherein the pseudo map file entry has no association with any of the plurality of workflow participants.

11. The method according to claim 1, further comprising:
    encrypting the atomic unit using a secret key; and
    wherein each of the map file entries includes a set of keys that provides differential types of access to the encrypted atomic unit to the plurality of workflow participants.

12. The method according to claim 1, wherein said information comprises reference names of a plurality of atomic units, said method further comprising:
    generating a new name for each of the plurality of atomic units;
    replacing occurrences of the atomic unit reference names in the document serialization with the new names for the atomic units; and
    wherein generating the map file further comprises generating the map file such that each of the map file entries includes the new names and access keys to the plurality of atomic units.

13. An apparatus for managing information in a document serialization, said information comprising a reference name of an atomic unit listed in the document serialization, said apparatus comprising:
    a processor; and
    a memory on which is stored machine readable instructions that when executed by the processor cause the processor to:
        generate a new name for the atomic unit reference name;
        replace occurrences of the atomic unit reference name in the document serialization with the new name for the atomic unit to conceal the atomic unit reference name;
        generate a map file in a secure digital document, said map file containing a map file entry for each of a plurality of workflow participants, wherein each of the map file entries includes the new name and an access key to access the atomic unit, wherein each of the plurality of workflow participants is associated with a respective symmetric key, and wherein the secure digital document is an encrypted and signed version of a digital document containing the atomic unit; and encrypt each of the map file entries using a respective symmetric key of the workflow participants.

14. The apparatus according to claim 13, wherein the machine readable instructions are further to cause the processor to determine which of the plurality of workflow participants are granted access to view the atomic unit reference name and to generate the map file entries for those workflow participants authorized to view the atomic unit reference name to further include a correlation between the new name and the atomic unit reference name and a reference path to the atomic unit.

15. The apparatus according to claim 13, wherein the machine readable instructions are further to cause the processor to generate a new reference path of the atomic unit and to replace occurrences of the reference path in the document serialization with the new reference path of the atomic unit to conceal the atomic unit reference path.

16. The apparatus according to claim 13, wherein each of the plurality of workflow participants is associated with a respective public key, wherein the machine readable instructions are further to cause the processor to encrypt the symmetric keys using public keys of the workflow participants.

17. The apparatus according to claim 13, wherein said information in the document serialization includes a file size reference of the atomic unit, and wherein the machine readable instructions are further to cause the processor to obfuscate the file size reference of the atomic unit.

18. The apparatus according to claim 17, wherein the machine readable instructions are further to cause the processor to obfuscate a number of the plurality of workflow participants identified in the map file by generating a pseudo map file entry, wherein the pseudo map file entry has no association with any of the plurality of workflow participants.

19. The apparatus according to claim 13, wherein said information comprises reference names of a plurality of atomic units, and wherein the machine readable instructions are further to cause the processor to generate a new name for each of the plurality of atomic units, to replace occurrences of the atomic unit reference names in the document serialization with the new names for the atomic units, and to generate the map file such that each of the map file entries includes the new names and access keys to the plurality of atomic units.

20. A non-transitory computer readable storage medium on which is embedded at least one computer program that when executed by a processor implement a method for managing information in a document serialization, said information comprising a reference name and a file size reference of an atomic unit listed in the document serialization, wherein said at least one computer program includes a set of instructions that cause the processor to:

generate a new name for the atomic unit reference name;

replace occurrences of the atomic unit reference name in the document serialization with the new name for the atomic unit to conceal the atomic unit reference name;

obfuscate the file size reference of the atomic unit;

generate a map file in a secure digital document, said map file containing a map file entry for each of a plurality of workflow participants, wherein each of the map file entries includes the new name and an access key to access the atomic unit,. [[and]] wherein each of the plurality of workflow participants is associated with a respective symmetric key, and wherein the secure digital document is an encrypted and signed version of a digital document containing the atomic unit; and encrypt each of the map file entries using a respective symmetric key of the workflow participants.

* * * * *

UNITED STATES PATENT AND TRADEMARK OFFICE
CERTIFICATE OF CORRECTION

PATENT NO. : 8,972,747 B2  
APPLICATION NO. : 13/014062  
DATED : March 3, 2015  
INVENTOR(S) : Steven J. Simske et al.

Page 1 of 1

It is certified that error appears in the above-identified patent and that said Letters Patent is hereby corrected as shown below:

In the Claims

In column 18, line 26 approx., in Claim 20, delete "unit., [[and]]" and insert -- unit, --, therefor.

Signed and Sealed this  
Eighteenth Day of August, 2015

Michelle K. Lee  
*Director of the United States Patent and Trademark Office*